Patented Nov. 5, 1935

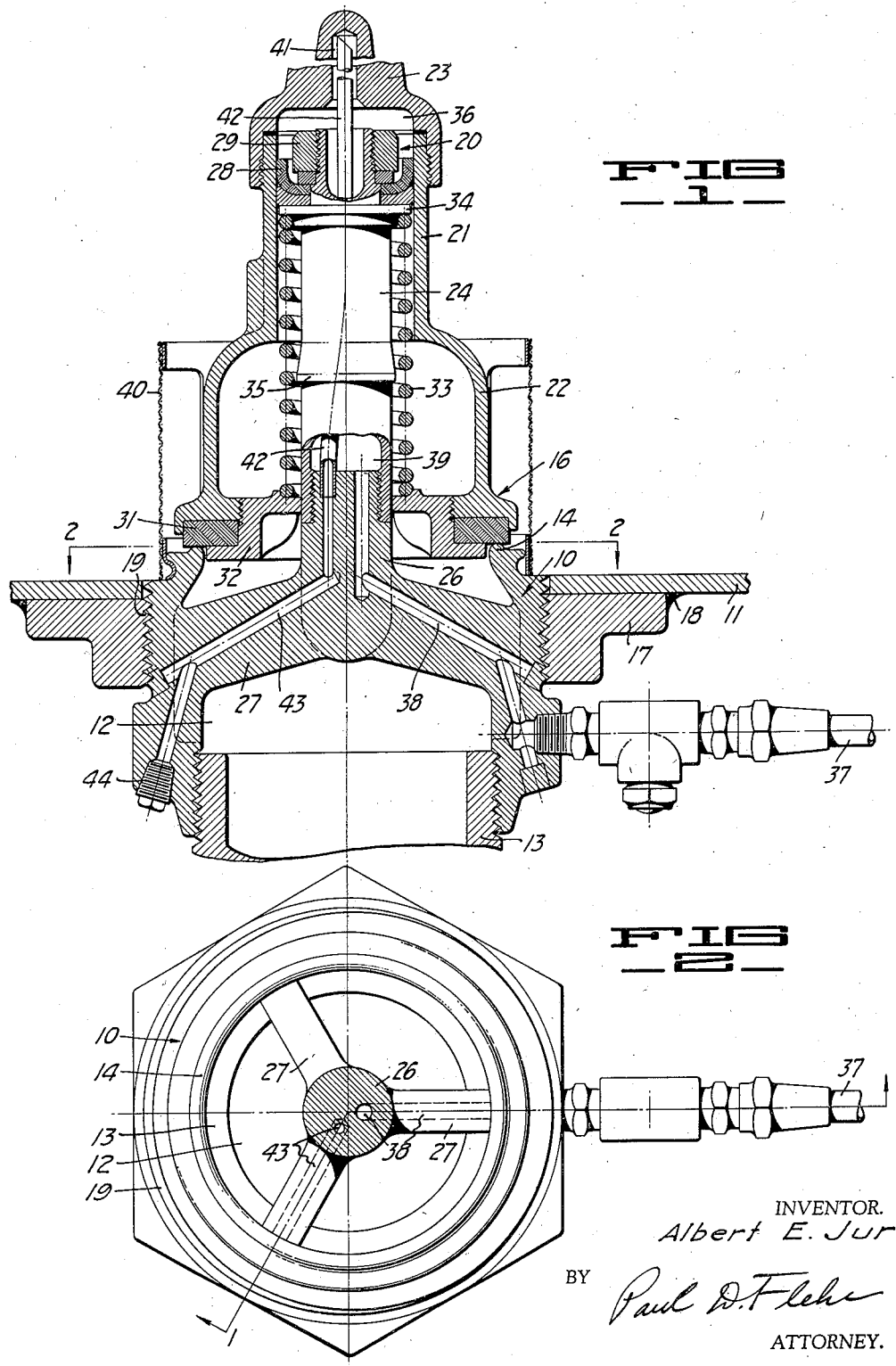

2,019,786

UNITED STATES PATENT OFFICE 2,019,786

HYDRAULICALLY OPERATED VALVE UNIT

Albert E. Jurs, Piedmont, Calif., assignor to Shand & Jurs Company, Berkeley, Calif., a copartnership consisting of Reginald C. Shand and Albert E. Jurs Original application March 25, 1931, Serial No. 525,152. Divided and this application June 6, 1934, Serial No. 729,185

4 Claims. (Cl. 137—21)

This invention relates generally to valve units which are adapted for operation by application of liquid under pressure, and which are useful in conjunction with systems for dispensing liquid from tanks or tank compartments. The subject-matter disclosed and claimed herein has been divided from my co-pending application Serial No. 525,152, filed March 25, 1931, now Patent No. 1,976,445 granted Oct. 9, 1934, and entitled "Valve control system".

It is an object of the invention to provide a novel valve unit construction of the above character, having provision for venting or bleeding off trapped air or gas from the closed liquid chamber of the same. In this connection the invention is characterized by the fact that such trapped air can be vented without removing the unit from the tank with which it may be associated, and without utilizing an undesirable vent tube extending upwardly from the unit to the top of the tank.

Further objects of the invention will appear from the following description in which the preferred embodiment of the invention has been set forth in detail in conjunction with the accompanying drawing.

Referring to the drawing:

Fig. 1 is a side elevational view, in cross-section, illustrating a valve unit incorporating the present invention.

Fig. 2 is a cross-sectional detail taken along the line 2—2 of Fig. 1.

The valve unit as illustrated in the drawing consists of a body 10, which is a part of a general mounting for securing the unit to the bottom wall 11 of a liquid tank or tank compartment. The body is formed hollow to afford a passage 12 therethrough for flow of liquid from the tank. Conduit 13, to receive the liquid, is shown suitably connected to the body 10 and in communication with the passage 12. Formed upon the upper part of the body 10 there is an annular valve seat 14 which is adapted to co-operate with a movable valve member designated generally at 16. To form a detachable connection between the body 10 and the bottom wall 11 of the tank, any one of a number of suitable expedients can be adopted, such as an annular ring 17 having a weld connection 18 with the bottom wall 11, and having a threaded connection 19 with the body 10.

For effecting movement of the valve member 16 between open and closed positions with respect to the valve seat 14, by application of liquid under pressure from a suitable source, such as a hydraulic actuator, I provide a piston assembly 20 which co-operates with an associated cylinder 21. Cylinder 21 forms the upper part of a shell, the lower portion 22 of which is enlarged or bell-shaped to carry the movable valve member 16. The upper end of the cylinder 21 is enclosed by a cap 23, certain features of which will presently be explained.

The piston assembly 20 is formed upon the upper end of an upright tubular standard 24. The lower end of this standard is secured to an inner unstanding member 26 which can be formed as a part of the body 10 and which is shown connected to the remainder of the body by the radial arms 27. To form the piston assembly 20, the upper end portion of standard 24 is of reduced external diameter to carry a cup washer 28 which is held in place by the nut 29.

The lower face of valve member 16 preferably carries a suitable sealing ring 31 to more effectively seal with respect to the valve seat 14, and the sealing ring is retained by suitable means, such as an internal nut 32. This nut is apertured to accommodate the standard 24, and therefore likewise serves, in conjunction with the piston assembly 20, to guide the vale member and the cylinder 21, and thus prevent lateral displacement. In order to normally urge or bias valve member 16 together with cylinder 21 toward closed position, there is shown a compression spring 33, the upper end of which seats upon a flange 34 carried by standard 24, and the lower end of which seats upon nut 32. Upward movement of the valve member is limited by engagement of nut 32 with shoulder 35.

The space 36 above the piston assembly 20 forms a closed chamber for receiving liquid under pressure, to effect operation of the valve unit. Externally of the tank, the body 10 connects with a tube or pipe 37, which leads to a suitable source of liquid pressure, such as a hydraulic actuator of the type disclosed in my aforesaid co-pending application Serial No. 525,152. Pipe 37 communicates with chamber 36 through passage 38 in the body 10, and passage 39 extending upwardly through the standard 24. When a suitable liquid, such as oil, is delivered under pressure through pipe 37, hydraulic pressure in chamber 36 serves to lift cylinder 21 together with the valve member 16 to open position, against the pressure of compression spring 33. At such time liquid may flow from the tank through the passage 12 and the conduit 13. When the applied liquid pressure is released, the force of spring 33 is sufficient to deliver liquid from chamber 36 back through passage 38 and pipe 37, so that the valve member 16 is closed upon seat 14. If desired, the seat may be surrounded by a suitable screen or strainer 40.

In a valve unit such as described above, there should be substantially no trapped air or gas within the closed chamber 36. The presence of a substantial amount of trapped air at this point or within the connections between this chamber and the hydraulic actuator, will make for improper operation or may even render the system entirely inoperative. This is for the reason that, since air or gas is highly compressible, a considerable quantity of liquid must first be delivered by the actuator to effect compression of the air or gas, after which the valve is lifted from closed position. If the hydraulic actuator is designed to deliver a definite predetermined quantity of liquid, the presence of trapped air may cause the valve unit to be actuated to only partially open position, or may result in no appreciable opening movement. As a novel means to permit bleeding of trapped air from chamber 36, I have shown a pocket 41 extending upwardly into cap 23, with the lower end of the same in communication with the main portion of chamber 36. Extending up into pocket 41 there is a bleed or vent tube 42, the upper end of which is open. The lower end of the vent tube communicates with a passage 43 formed in the body 10, and the lower end of this passage is normally sealed by a removable plug 44. It is evident that any trapped air or gas will find its way into chamber 36 and pocket 41. If sufficient air exists to interfere with proper operation of the valve unit, plug 44 is temporarily removed and sufficient pressure is applied to the liquid to expel the air down through the bleed tube 41 and out through the lower end of passage 43. When all of the air has been expelled in this manner (which the operator can readily determine by a flow of oil down through passage 43), this passage is again sealed by plug 44.

The mode of operation of my device, and its desirable characteristics, will be evident from the above description. Although the closed liquid chamber 36 is elevated with respect to the pipe connection 37, trapped air existing after initial installation, or air which may have accumulated over a period of operation, can be readily vented without removing the valve unit from its operative positioning with respect to the tank. Likewise, the construction described obviates the necessity of providing a vent tube extending from the valve unit to the top of the tank, which would be undesirable.

I claim:

1. A hydraulic pressure-operated valve unit for dispensing liquid from tanks or tank compartments, comprising a mounting adapted to be secured to the lower wall of a tank, a stationary valve seat carried by said mounting, said mounting having a passage therethrough for flow of liquid from the tank to the exterior thereof, a piston disposed within the tank and fixed with respect to the mounting, a movable cylinder surrounding the piston, a valve member secured to the cylinder and co-operating with said valve seat, said piston together with the cylinder forming a closed chamber for receiving liquid under pressure to operate the valve between open and closed positions, a normally closed vent passage leading from the upper portion of said chamber through said piston and through said mounting to the exterior thereof, and a passage forming a hydraulic connection from an exterior source of liquid under pressuure to said chamber, said last passage likewise extending through said piston and said mounting.

2. A hydraulic pressure-operated valve unit for dispensing liquid from tanks or tank compartments, comprising a mounting adapted to be secured to the lower wall of a tank, a stationary valve seat carried by said mounting, said mounting having a passage therethrough for flow of liquid from the tank to the exterior thereof, a piston disposed within the tank and fixed with respect to the mounting, a movable cylinder surrounding the piston, a valve member secured to the cylinder and co-operating with said valve seat, said piston together with the cylinder forming a closed chamber for receiving liquid under pressure to operate the valve between open and closed positions, the upper portion of said chamber being a pocket of reduced cross-sectional area compared to the main portion of the same, a normally closed vent passage leading downwardly from the upper part of said pocket through said piston and through said mounting to the exterior thereof, and a passage forming a hydraulic connection from an exterior source of liquid under pressure to said chamber.

3. A hydraulic pressure-operated valve unit for dispensing liquid from tanks or tank compartments, comprising a mounting adapted to be secured to the lower wall of a tank, a stationary valve seat carried by said mounting, said mounting having a passage therethrough for flow of liquid from the tank to the exterior thereof, a piston disposed within the tank above said passage, means including webs extending across said passage for securing the piston to said mounting, a movable cylinder surrounding the piston, a valve member secured to the cylinder and co-operating with the valve seat, said piston together with the cylinder forming a closed chamber for receiving liquid under pressure to operate the valve between open and closed positions, a normally closed vent passage leading from the upper portion of said chamber through said piston, through one of said webs, and through said mounting to the exterior thereof, and a passage forming a hydraulic connection from an exterior source of liquid under pressure to said chamber, said last passage likewise extending through said piston, through another one of said webs, and through said mounting.

4. A hydraulic pressure-operated valve unit for dispensing liquid from tanks or tank compartments, comprising a mounting adapted to be secured to the lower wall of a tank, a stationary valve seat carried by said mounting, said mounting having a passage therethrough for flow of liquid from the tank to the exterior thereof, a piston disposed within the tank above said passage, means including webs extending across said passage for securing the piston to said mounting, a movable cylinder surrounding the piston, a valve member secured to the cylinder and co-operating with the valve seat, said piston together with the cylinder forming a closed chamber for receiving liquid under pressure to operate the valve between open and closed positions, the upper portion of said chamber being a pocket of reduced cross-sectional area compared to the main portion of the same, a normally closed vent passage extending from the upper part of said passage through said piston, through one of said webs, and through said mounting to the exterior thereof, and a passage forming a hydraulic connection from an exterior source of liquid under pressure to said chamber, said last passage likewise extending through said piston, through another one of said webs, and through said mounting.

ALBERT E. JURS.